United States Patent [19]

Henschel

[11] Patent Number: 4,801,072

[45] Date of Patent: Jan. 31, 1989

[54] HOMOGENEOUS, DUCTILE BRAZING FOILS

[75] Inventor: Claude Henschel, Mt. Freedom, N.J.

[73] Assignee: Allied-Signal Inc., Morris Township, Morris County, N.J.

[21] Appl. No.: 856,861

[22] Filed: Apr. 21, 1986

Related U.S. Application Data

[63] Continuation of Ser. No. 639,559, Aug. 10, 1984, abandoned.

[51] Int. Cl.[4] ............ B23K 35/22; B23K 35/30; B22D 11/06
[52] U.S. Cl. ................ 228/245; 228/263.13; 228/263.15; 228/263.16; 164/463
[58] Field of Search ............ 220/441, 459, 452, 453, 220/454; 148/403; 164/403, 423; 228/203, 245, 263.13, 263.14, 263.15, 263.16

[56] References Cited

U.S. PATENT DOCUMENTS

| 3,871,836 | 3/1975 | Polk et al. | |
|---|---|---|---|
| 4,067,732 | 1/1978 | Ray | 75/126 P |
| 4,148,973 | 4/1979 | Sexton et al. | 428/680 |
| 4,190,095 | 2/1980 | Bedell | 164/423 |
| 4,260,666 | 4/1981 | DeCristofaro et al. | 148/403 X |
| 4,480,016 | 10/1984 | Henschel | 428/678 |

FOREIGN PATENT DOCUMENTS 2856795 10/1979 Fed. Rep. of Germany ...... 164/463

*Primary Examiner*—Kuang Y. Lin
*Attorney, Agent, or Firm*—Gus T. Hampilos; Ernest D. Buff

[57] ABSTRACT

Metal parts are brazed by means of an amorphous filler metal foil. The brazing foil, useful for brazing stainless steels, has a composition consisting essentially of about 0-10 atom percent iron, about 0-20 atom percent chromium, about 3-5 atom percent molybdenum, about 5-35 atom percent cobalt, about 14-19 atom percent boron and the balance nickel and incidental impurities. The ductile foil permits fabrication of preforms of complex shapes which do not require binders and/or fluxes necessary for brazing powders presently used to braze stainless steels and nickel base alloys, and exhibits excellent braze-metal and high-temperature strengths.

6 Claims, No Drawings

HOMOGENEOUS, DUCTILE BRAZING FOILS

This application is a continuation of application Ser. No. 639,559 Aug. 10, 1984, now abandoned.

BACKGROUND OF THE INVENTION

1. Field of the Invention

This invention relates to brazing of metal parts and, in particular, to a homogeneous, ductile brazing material useful in brazing stainless steels and high nickel alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

The brazing alloys heretofore used with stainless steels, designated AWS BNi compositions, contain a substantial amount (about 3 to 11 weight percent) of metalloid elements such as boron, silicon and/or phosphorus. Consequently, such alloys are very brittle and are available, for the most part, as powder, powder-binder pastes, powder-binder tapes and bulky cast preforms. Powders are generally unsuitable for many brazing operations, such as dip brazing, and do not easily permit brazing of complex shapes. Although some powders are available as pastes employing organic binders, the binders form objectionable voids and residues during brazing.

Some brazing alloys are available in full form. Such materials are generally fabricated by (1) rapidly quenching a melt of the composition on a rotating quench wheel at a rate of at least about $10^5$° C./sec to form a glassy metal, (2) rolling and heat-treating the composition or (3) powder metallurgical techniques. Rolled foil is not sufficiently ductile to permit stamping of complex shapes therefrom. Powder metallurgical foil is not homogeneous and employs binders, which forms objectionable voids and residues during brazing. Glassy metal foils are not easily made and have braze-metal strengths somewhat lower than that of the joint's base metal with the result that the braze-metal oftentimes becomes the weakest link in the brazed joint. Moreover, the high-temperature strength of such glassy metal foils is generally lower than that considered desirable for brazing of components used in turbines, heat exchangers, evaporators and the like.

Glassy metal alloy coating compositions have been disclosed in U.S. Pat. No. 3,871,836, issued March 18, 1975 to Polk et al. These alloys include compositions having the formula $M_a X_b$, where M is at least one element selected from the group consisting of Ni, Fe, Co, Cr and V, X is at least one element selected from the group consisting of P, B, C, Si, Al, Sb, Sn, In, Ge and Be, a ranges from 65 atomic percent to 90 atomic percent, b ranges from 10 atomic percent to 35 atomic percent, and up to about ⅓ of M can be replaced by at least one element selected from the group consisting of molybdenum, manganese, titanium, tungsten and copper. No brazing compositions are disclosed therein, however.

There remains a need in the art for an amorphous metal foil having increased braze-metal and high-temperature strengths.

SUMMARY OF THE INVENTION

The present invention provides an amorphous metal brazing foil that is easy to fabricate and has excellent braze-metal and high-temperature strengths. The brazing foil is composed of metastable material having at least about 50 percent glassy structure and consists essentially of about 0 to 10 atom percent iron, about 0 to 20 atom percent chromium, about 3 to 5 atom percent molybdenum, about 5 to 35 atom percent cobalt, about 14 to 19 atom percent boron, the balance being essentially nickel and incidental impurities.

The brazing foil of this invention is particularly adapted to be fabricated by quenching a melt of the composition on a rotating quench wheel at a rate of at least about $10^5$° C./sec. A thin, flexible ribbon is thereby produced that is useful for brazing as cast, or can be stamped into complex shapes to provide braze preforms. Further, the amorphous metal brazing foil (1) eliminates the need for binders and pastes that often form voids and contaminating residues, (2) permits brazing of stainless steels to be accomplished by means of alternative brazing processes, e.g., induction brazing as well as dip brazing in molten salts, (3) improves braze joint strength, (4) enhances joining precision and (5) reduces process time.

DESCRIPTION OF THE PREFERRED EMBODIMENTS

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with a preferred embodiment of the invention, there is provided a homogeneous, ductile brazing foil. The brazing foil has a composition consisting essentially of about 0–10 atom percent iron, about 0–20 atom percent chromium, about 3–5 atom percent molybdenum, about 5–35 atom percent cobalt, about 14–19 atom percent boron and the balance essentially nickel and incidental impurities. These compositions are compatible with and more noble than stainless steels and are suitable for brazing austenitic and ferritic stainless steels, as well as nickel base alloys.

By homogeneous is meant that the foil, as produced, is of substantially uniform composition in all dimensions. By ductile is meant that the foil can be bent to a round radius as small as ten times the foil thickness without fracture.

Examples of brazing alloy compositions within the scope of the invention are set forth in Table 1 below.

TABLE 1

|  | Composition, % | | | | | |
| --- | --- | --- | --- | --- | --- | --- |
|  | Fe | Ni | Cr | Mo | Co | B |
| Atom % | 5 | 50 | 5 | 4 | 20 | 16 |
| Atom % | 5 | 40 | 15 | 4 | 20 | 16 |

TABLE 1-continued

|  | Composition, % | | | | | |
| --- | --- | --- | --- | --- | --- | --- |
|  | Fe | Ni | Cr | Mo | Co | B |
| Atom % | 5 | 44 | 10 | 5 | 20 | 16 |
| Atom % | 5 | 47 | 10 | 2 | 20 | 16 |
| Atom % | 5 | 55 | 10 | 4 | 10 | 16 |
| Atom % | 5 | 45 | 10 | 4 | 30 | 16 |
| Atom % | 0 | 48 | 10 | 4 | 20 | 18 |
| Atom % | 10 | 38 | 10 | 4 | 20 | 18 |

The brazing temperature of the brazing alloys of the invention ranges from about 925° to 1320° C. (1700° to 2400° F.). The temperature of brazing is thus above the sensitizing temperature range of the 300 series stainless steels. This is in contrast to the brazing temperatures of silver brazing alloys, which fall within the sensitizing temperature range. As is well-known, when 18-8 stainless steels are heated at about 510° to 790° C. (950° to 1450° F.) for any appreciable length of time, they become sensitized or susceptible to intergranular corrosion. This is apparently due to the depletion of chromium in the grain-boundary areas. Sensitizing is thus avoided by use of the brazing foils of the invention.

The brazing foils of the invention are prepared by cooling a melt of the desired composition at a rate of at least about $10^5$° C./sec, employing metal alloy quenching techniques well-known to the glassy metal alloy art; see, e.g., U.S. Pat. No. 3,871,836, discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material is at least 50 percent glassy, in which case there is no long-range order. X-ray diffraction patterns of glassy metal alloys show only a diffuse halo, similar to that observed for inorganic oxide glasses. Such glassy alloys must be at least 50 percent glassy to be sufficiently ductile to permit subsequent handing, such as stamping complex shapes from ribbons of the alloys. Preferably, the glassy metal alloys must be at least 80 percent glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0015 to 0.005 inch thick, which is also the desired spacing between bodies being brazed. Such spacing maximizes the strength of the braze joint. Thinner foils stacked to form a thickness of about 0.0015 to 0.0100 inch may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

In general, the strength of the resulting brazed joints is considerably greater than that of brazed joints prepared from conventional powder brazes. Moreover, braze joints made with ductile brazing ribbons of the invention are consistently stronger than joints made with paste. With alloys based on the Fe-Ni-Cr-Mo-Co-B system, braze joints made with ribbon exhibit generally greater shear and high-temperature strengths than joints made with other composition foils. Without subscribing to any particular theory, it appears that the lower surface area of the ribbon, which would be less susceptible to oxidation than powder, and the greater area of contact between base metal and ribbon as compared with base metal and powder, together with the particular composition of the foil, contribute significantly to ease of fabrication and joint strength.

The brazing foils of the invention are also superior to most powder brazes in providing good braze joints. This is probably due to the ability to apply the brazing foil where the braze is required, rather than depending on capillarity to transport braze filler from the edge of surfaces to be brazed.

EXAMPLES

EXAMPLE 1

Ribbons about 2.5 to 38.1 mm (about 0.10 to 1.5 inch) wide and about 40 to 120 μm (about 0.0015 to 0.05 inch) thick were formed by squirting a melt of the particular composition by overpressure of argon onto a rapidly rotating copper chill wheel (surface speed about 3000 to 6000 ft/min). Metastable, homogeneous ribbons of substantially glassy alloys having the following composition in weight percent and atom percent were produced:

| Sample | Composition | | | | | |
| --- | --- | --- | --- | --- | --- | --- |
|  | Fe | Ni | Cr | B | Mo | Co |
| Weight % | 5.5 | 52.6 | 10.3 | 3.4 | 7.6 | 20.6 |
| Atom % | 5 | 45 | 10 | 16 | 4 | 20 |

EXAMPLE 2

Tensile test specimens were cut from AISI type 316SS and from Hastelloy X in strip form. The thicknesses were both 0.125 inch. A brazing alloy of the invention, a glassy, ductile ribbon of nominal composition of the above sample and having dimensions 0.0017 inch thick by 1.0" wide was used to braze some of the test specimens.

The tensile specimens were dimensioned and fabricated per AWS C3.2-63. Braze joints were of the lap type, with the lap dimension carefully controlled to ⅜ inch. Uncut tensile specimens were kept as controls to determine tensile properties after the brazing cycle. Brazing specimens were degreased with warm benzene. Lap joints containing brazing ribbons of the invention were assembled with one ribbon on the length of the lap joint. In the case of these brazing alloys, the ribbons acted as the spacers.

Brazing was done in a cold wall vacuum furnace at a vacuum of $1 \times 10^{-5}$ torr. The furnace was operated at 2200° F. (1205° C.) and specimens were held at temperature for 10 minutes.

Upon brazing, all shear specimens were subjected to tensile shear testing, with the following results:

| Metal | Range | Avg. |
|---|---|---|
| | Joint Shear Strength, psi | |
| 316SS | 22,400–25,333 | 24,355 |
| Hastelloy X | 15,947–18,453 | 16,716 |
| | Joint Tensile Strength, psi | |
| 316SS | 67,200–76,000 | 73,067 |
| Hastelloy X | 47,841–55,359 | 51,147 |

The ultimate tensile strength of the 316SS control after brazing cycle was as follows:

| 316SS | 86,400 psi |
|---|---|

EXAMPLE 3

Three tensile test specimens of AISI Type 316SS were prepared according to the procedure set forth in Example 2, except that the brazing alloy used as filler was AWS classification BNi-2, and the brazing temperature was that recommended by AWS for BNi-2, namely 1950° F. (1070° C.).

Upon brazing, all shear specimens were subjected to tensile shear testing, with the following results,

| Metal | Range | Avg. |
|---|---|---|
| | Joint Shear Strength, psi | |
| 316SS | 14,560–22,880 | 18,471 |
| | Joint Tensile Strength, psi | |
| 316SS | 43,680–68,640 | 55,413 |

Of the six 316SS specimens brazed in Examples 2 and 3, good brazes were obtained in all cases. However, the three 316SS specimens brazed with brazing foil of the invention had average joint shear and tensile strengths percent greater than the three 316SS specimens brazed with BNi-2.

Having thus described the invention in rather full detail, it will be understood that these details need not be strictly adhered to but that various changes and modifications may suggest themselves to one skilled in the art, all falling within the scope of the present invention as defined by the subjoined claims.

I claim:

1. A process for fabricating a brazed article comprising the steps of:
   (a) providing a homogeneous, ductile brazing foil composed of metastable material having at least 50% glassy structure and a composition consisting of from about 0 to about 10 atom percent iron, from about 5 to about 15 atom percent chromium, from about 2 to about 5 atom percent molybdenum, from about 10 to about 30 atom percent cobalt, from about 16 to about 18 atom percent boron, the balance essentially nickel and incidental impurities;
   (b) interposing said brazing foil between at least a portion of each of two parts;
   (c) causing said brazing foil to be melted and therafter solidifying the molten material to effect brazing of said portions.

2. The process of claim 1 wherein said portions are composed of materials selected from the group consisting of iron, iron alloys, nickel, and nickel alloys.

3. The process of claim 1 wherein said portions are composed of materials selected from the group of stainless steel and nickel base alloys.

4. The process of claim 1 wherein said portions are composed of grade 316 stainless steel.

5. The process of claim 4 wherein said brazed portion has a joint tensile strength of at least about 67,200 psi and a joint sheer strength of at least about 22,400 psi.

6. The process of claim 1 wherein the brazing foil is formed by a process of:
   (1) forming a melt of said composition; and,
   (2) quenching said melt on a rapidly moving chill surface at a rate of at least about $10^5$ C. per second to produce said brazing foil.

* * * * *